United States Patent
Fox et al.

(10) Patent No.: US 11,488,616 B2
(45) Date of Patent: *Nov. 1, 2022

(54) REAL-TIME ASSESSMENT OF CALL QUALITY

(71) Applicant: International Business Machines Corporation, Armonk, NY (US)

(72) Inventors: Jeremy R. Fox, Georgetown, TX (US); Kelley Anders, East New Market, MD (US); Jonathan Dunne, Dungarvan (IE); Liam S. Harpur, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 623 days.

This patent is subject to a terminal disclaimer.

(21) Appl. No.: 16/523,105

(22) Filed: Jul. 26, 2019

(65) Prior Publication Data
US 2019/0355377 A1 Nov. 21, 2019

Related U.S. Application Data

(63) Continuation of application No. 15/984,911, filed on May 21, 2018.

(51) Int. Cl.
| | |
|---|---|
| *G10L 21/0208* | (2013.01) |
| *G10L 21/0224* | (2013.01) |
| *G10L 21/0264* | (2013.01) |
| *H04M 3/22* | (2006.01) |
| *G06N 20/00* | (2019.01) |

(52) U.S. Cl.
CPC ......... *G10L 21/0208* (2013.01); *G06N 20/00* (2019.01); *G10L 21/0224* (2013.01); *G10L 21/0264* (2013.01); *H04M 3/2236* (2013.01)

(58) Field of Classification Search
CPC . G10L 21/02; G10L 21/0208; G10L 21/0216; G10L 21/0224
See application file for complete search history.

(56) References Cited

U.S. PATENT DOCUMENTS

| | | | |
|---|---|---|---|
| 4,630,304 | A | 12/1986 | Borth et al. |
| 5,680,393 | A | 10/1997 | Bourmeyster et al. |

(Continued)

FOREIGN PATENT DOCUMENTS

CN 107481728 A 12/2017

OTHER PUBLICATIONS

"Mushroom Networks Blog: Set your network on autopilot", https://www.mushroomnetworks.com/blog/what-is-mos-mean-opinion-score-for-voip/, Apr. 10, 2018, 3 pgs.

(Continued)

*Primary Examiner* — Shaun Roberts
(74) *Attorney, Agent, or Firm* — Maeve M. Carpenter; Hunter E. Webb; Keohane & D'Alessandro, PLLC

(57) ABSTRACT

Disclosed embodiments provide techniques for improved call quality during telephony sessions. The speech quality of an active voice session is periodically evaluated using multiple noise reduction algorithms. In an instance where the speech quality of the currently used noise reduction algorithm is below the quality of another noise reduction algorithm, the telephony system may switch to a new noise reduction algorithm as the currently used (active) noise reduction algorithm in order to improve call quality during an active voice session.

14 Claims, 8 Drawing Sheets

(56) References Cited

U.S. PATENT DOCUMENTS

| | | | |
|---|---|---|---|
| 5,848,163 A | 12/1998 | Gopalakrishnan et al. | |
| 8,903,651 B2* | 12/2014 | Homma | G01C 21/00 |
| | | | 701/428 |
| 9,852,726 B2 | 12/2017 | Singaraju | |
| 2003/0061042 A1* | 3/2003 | Garudadri | G10L 15/30 |
| | | | 704/E15.047 |
| 2007/0041589 A1 | 2/2007 | Patel et al. | |
| 2007/0055505 A1* | 3/2007 | Doclo | G10L 21/0208 |
| | | | 704/226 |
| 2007/0112563 A1* | 5/2007 | Krantz | G10L 25/69 |
| | | | 704/216 |
| 2008/0312918 A1* | 12/2008 | Kim | G10L 15/01 |
| | | | 704/233 |
| 2010/0088093 A1* | 4/2010 | Lee | G10L 15/20 |
| | | | 704/E15.045 |
| 2013/0080056 A1* | 3/2013 | Homma | G10L 21/0208 |
| | | | 704/226 |
| 2014/0270249 A1* | 9/2014 | Jasiuk | G10L 21/0208 |
| | | | 381/94.1 |
| 2015/0281853 A1* | 10/2015 | Eisner | H04R 25/505 |
| | | | 381/312 |
| 2015/0296294 A1* | 10/2015 | Paquier | G10L 21/0364 |
| | | | 381/71.1 |
| 2016/0019890 A1* | 1/2016 | Amman | G10L 15/20 |
| | | | 704/233 |
| 2016/0198030 A1 | 7/2016 | Kim | |
| 2017/0330579 A1* | 11/2017 | Zhang | G10L 21/0364 |
| 2018/0190313 A1* | 7/2018 | Sadri | G10L 19/00 |
| 2018/0294000 A1* | 10/2018 | Steele | H04R 1/1083 |

OTHER PUBLICATIONS

"Techniques for Restoring Audio", Applying noise reduction techniques and restoration effects, https://helpx.adobe.com/audition/using/noise-reduction-restoration-effects.html, Apr. 10, 2018, 23 pgs.

"Mean opinion score (MOS) terminology", International Telecommunication Union, Series P: Terminals and Subjective and Objective Assessment Methods Methods for objective and subjective assessment of speech and video quality, Jul. 2016, 18 pgs.

Appendix P, "List of IBM Patents or Patent Applications Treated as Related", Mar. 18, 2020, 2 pages.

Shaun A. Roberts, USPTO Office Action, U.S. Appl. No. 15/984,911, dated Apr. 5, 2022, 24 pages.

Roberts, Shaun A., U.S. Appl. No. 16/523,105, Notice of Allowance dated Apr. 5, 2022, 24 pgs.

* cited by examiner

REAL-TIME ASSESSMENT OF CALL QUALITY

The present patent document is a continuation of U.S. patent application Ser. No. 15/984,911, filed May 21, 2018, entitled "REAL-TIME ASSESSMENT OF CALL QUALITY", the disclosure of which is incorporated herein by reference.

FIELD OF THE INVENTION

The present invention relates generally to real-time assessment of call quality, and more particularly to systems and methods for noise reduction in a telephony system.

BACKGROUND

Noise reduction is the process of removing or minimizing noise in a signal. Noise can be random, white noise, sound like a hiss, etc. The noise can be distracting and diminish sound quality of an audio file or transmission. Noise reduction algorithms have been developed that function to reduce this kind of noise. However, a noise reduction algorithm may have limitations as to its effectiveness. Accordingly, there exists a need for improvements in assessments of call sound quality.

SUMMARY

In one embodiment, there is provided a computer-implemented method for noise reduction in a telephony system, comprising: obtaining a raw sample of an active voice session; obtaining a system-processed sample of the active voice session, wherein the system-processed sample temporally corresponds to the raw sample; processing the system-processed sample with a plurality of noise reduction algorithms to generate a noise-reduced sample corresponding to each algorithm of the plurality of noise reduction algorithms; comparing the raw sample and each noise-reduced sample, and computing a quality score for each noise-reduced sample; identifying an active noise reduction algorithm; identifying an active quality score corresponding to the active noise reduction algorithm; for each algorithm of the plurality of noise reduction algorithms, subtracting the active quality score from the quality score for each noise-reduced sample to compute a quality score delta corresponding to each noise-reduced algorithm; and changing the active noise reduction algorithm to a new noise reduction algorithm associated with a maximum quality score delta, in response to the maximum quality score delta exceeding a predetermined threshold.

In another embodiment, there is provided an electronic computing device comprising: a processor; a memory coupled to the processor, the memory containing instructions, that when executed by the processor, perform the steps of: obtaining a raw sample of an active voice session; obtaining a system-processed sample of the active voice session, wherein the system-processed sample temporally corresponds to the raw sample; processing the system-processed sample with a plurality of noise reduction algorithms to generate a noise-reduced sample corresponding to each algorithm of the plurality of noise reduction algorithms; comparing the raw sample and each noise-reduced sample, and computing a quality score for each noise-reduced sample; identifying an active noise reduction algorithm; identifying an active quality score corresponding to the active noise reduction algorithm; for each algorithm of the plurality of noise reduction algorithms, subtracting the active quality score from the quality score for each noise-reduced sample to compute a quality score delta corresponding to each noise-reduced algorithm; and changing the active noise reduction algorithm to a new noise reduction algorithm associated with a maximum quality score delta, in response to the maximum quality score delta exceeding a predetermined threshold.

In yet another embodiment, there is provided a computer program product for an electronic communication device comprising a computer readable storage medium having program instructions embodied therewith, the program instructions executable by a processor to cause the electronic communication device to perform the steps of: obtaining a raw sample of an active voice session; obtaining a system-processed sample of the active voice session, wherein the system-processed sample temporally corresponds to the raw sample; processing the system-processed sample with a plurality of noise reduction algorithms to generate a noise-reduced sample corresponding to each algorithm of the plurality of noise reduction algorithms; comparing the raw sample and each noise-reduced sample, and computing a quality score for each noise-reduced sample; identifying an active noise reduction algorithm; identifying an active quality score corresponding to the active noise reduction algorithm; for each algorithm of the plurality of noise reduction algorithms, subtracting the active quality score from the quality score for each noise-reduced sample to compute a quality score delta corresponding to each noise-reduced algorithm; and changing the active noise reduction algorithm to a new noise reduction algorithm associated with a maximum quality score delta, in response to the maximum quality score delta exceeding a predetermined threshold.

BRIEF DESCRIPTION OF THE DRAWINGS

Features of the disclosed embodiments will be more readily understood from the following detailed description of the various aspects of the invention taken in conjunction with the accompanying drawings.

Figure 1:
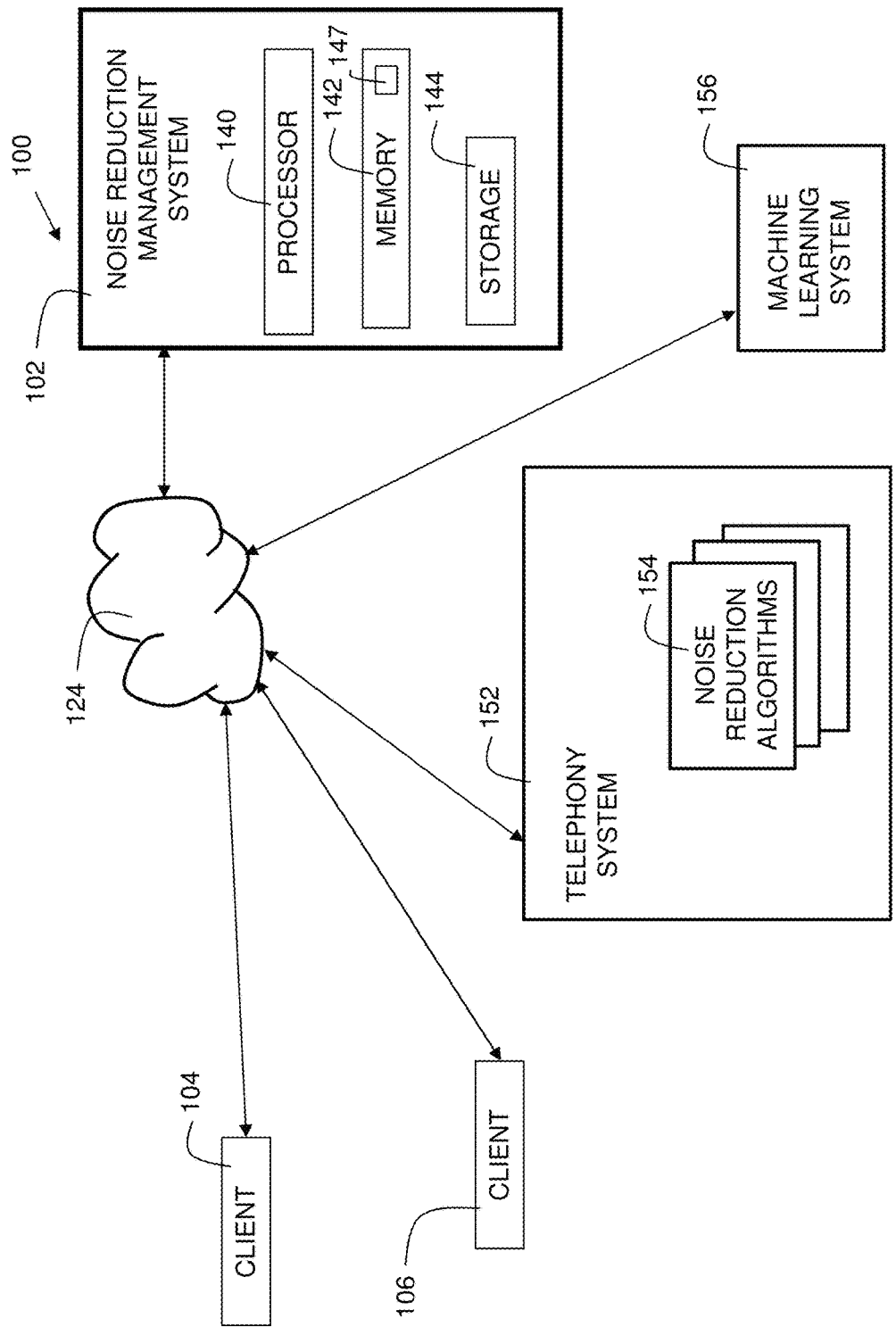
FIG. 1 is a diagram of an environment for embodiments of the present invention.

The drawings are merely representations, not necessarily intended to portray specific parameters of the invention. The drawings are intended to depict only example embodiments of the invention, and therefore should not be considered as limiting in scope. In the drawings, like numbering may represent like elements. Furthermore, certain elements in some of the Figures may be omitted, or illustrated not-to-scale, for illustrative clarity.

DETAILED DESCRIPTION

Disclosed embodiments provide techniques for improved call quality during telephony sessions. The speech quality of an active voice session is periodically evaluated using multiple noise reduction algorithms. In an instance where the speech quality of the currently used noise reduction algorithm is below the quality of another noise reduction algorithm, the telephony system may switch to a new noise reduction algorithm as the currently used (active) noise reduction algorithm in order to improve call quality during an active voice session.

With the proliferation of mobile electronic devices such as smartphones, tablet computers, wearable electronic devices, and laptop computers, it is now possible to verbally communicate using a wide variety of systems at many locations. In voice over IP (VoIP) systems, there can be a variety of codecs, device types, and network conditions that can be a factor in determining call quality. In addition, background noise at a caller location can change dynamically during a call. For example, a user on a mobile device who moves from the office to the street, and then into a vehicle during the course of an active voice session, can expose the active voice session to a variety of background noise types during the call. For acceptable call quality, it is often desirable to perform noise reduction to remove or reduce the background noise, enhancing the ability of users to understand the speech of the active voice session. The type and level of background noise may be more effectively reduced by a given noise reduction algorithm. As an example, when a user moves from a quieter environment to a noisier environment, a new noise reduction algorithm may work significantly better than the currently used noise reduction algorithm. With disclosed embodiments, the current (active) voice session is periodically monitored, and the speech quality is checked using various noise reduction algorithms. If a new noise reduction algorithm is significantly better than the currently used noise reduction algorithm, the telephony system can switch to the noise reduction algorithm offering better speech quality, thereby improving the user experience during the voice session.

Reference throughout this specification to "one embodiment," "an embodiment," "some embodiments", or similar language means that a particular feature, structure, or characteristic described in connection with the embodiment is included in at least one embodiment of the present invention. Thus, appearances of the phrases "in one embodiment," "in an embodiment," "in some embodiments", and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope and purpose of the invention. Thus, it is intended that the present invention cover the modifications and variations of this invention provided they come within the scope of the appended claims and their equivalents. Reference will now be made in detail to the preferred embodiments of the invention.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", or "has" and/or "having", when used in this specification, specify the presence of stated features, regions, integers, steps, operations, elements, and/or components, but do not preclude the presence or addition of one or more other features, regions, or elements.

FIG. 1 is a diagram 100 of an environment for embodiments of the present invention. System 102 includes a processor 140, memory 142, and storage 144. Memory 142 includes instructions 147, which when executed by processor 140, causes system 102 to implement elements of embodiments of the invention. System 102 is connected to network 124. Network 124 may be the Internet, a wide area network, a local area network, or any other suitable network. Client 104 and client 106 are each communication devices connected to the network 124. The communication devices may be smartphones, tablet computers, laptop computers, landline telephones, or any other suitable device with communication capabilities.

Telephony system 152 includes hardware (and software) for routing, placing, and management of calls. It also includes noise reduction algorithms 154. In embodiments, voice communication of users occurs between client 104 and client 106 thru network 124, using telephony system 152. Telephony system 152 applies a noise reduction algorithm from the set of noise reduction algorithms. System 102 can change the noise reduction algorithm during a call if it is determined that another noise reduction algorithm can enable significantly better call quality.

Machine learning system 156 is a computer system. It can be trained over time to assist in determining which noise reduction algorithm will provide the best result at a given time based on a set of input audio parameters. In embodiments, the speech quality of an active voice session is periodically evaluated using multiple noise reduction algorithms. In an instance where the speech quality of the currently active noise reduction algorithm is determined to be below the quality of another noise reduction algorithm, the telephony system may switch to the other noise reduction algorithm.

Accordingly, in embodiments, a raw sample of an active voice session is obtained. A system-processed sample of the active voice session is obtained. The system-processed sample temporally corresponds to the raw sample. The system-processed sample is processed with a plurality of noise reduction algorithms 154. This generates a noise-reduced sample corresponding to each algorithm of the plurality of noise reduction algorithms. The raw sample and each noise-reduced sample are compared, and a quality score for each noise reduced sample is computed.

In addition, in embodiments, an active noise reduction algorithm is identified. An active quality score corresponding to the active noise reduction algorithm is identified. The active quality score is subtracted from the quality score for each noise-reduced sample to compute a quality score delta corresponding to each noise reduction algorithm. The active noise reduction algorithm is changed to a new noise reduction algorithm associated with the maximum quality score delta, in response to the maximum quality score delta exceeding a predetermined threshold. The predetermined threshold may be selected such that the noise reduction algorithm is only switched when the new noise algorithm is significantly better. As an example, in a score system ranging from 0 to 5, the predetermined threshold may be 0.8. In such a scenario, the new noise reduction algorithm replaces the current noise reduction algorithm only if the new noise reduction algorithm has a score of at least 0.8 higher than the current noise reduction algorithm.

Embodiments include computing a plurality of audio parameters for the raw sample, and inputting the plurality of audio parameters for the first raw sample and the noise-reduction algorithm corresponding to the maximum quality score delta into the machine learning system 156 as training data.

Embodiments may further include obtaining a second raw sample. A plurality of audio parameters is computed for the second raw sample. The plurality of audio parameters for the second raw sample are input to the machine learning system 156. A recommended noise-reduction algorithm is obtained. The active noise reduction algorithm is changed to the recommended noise-reduction algorithm.

Figure 2:
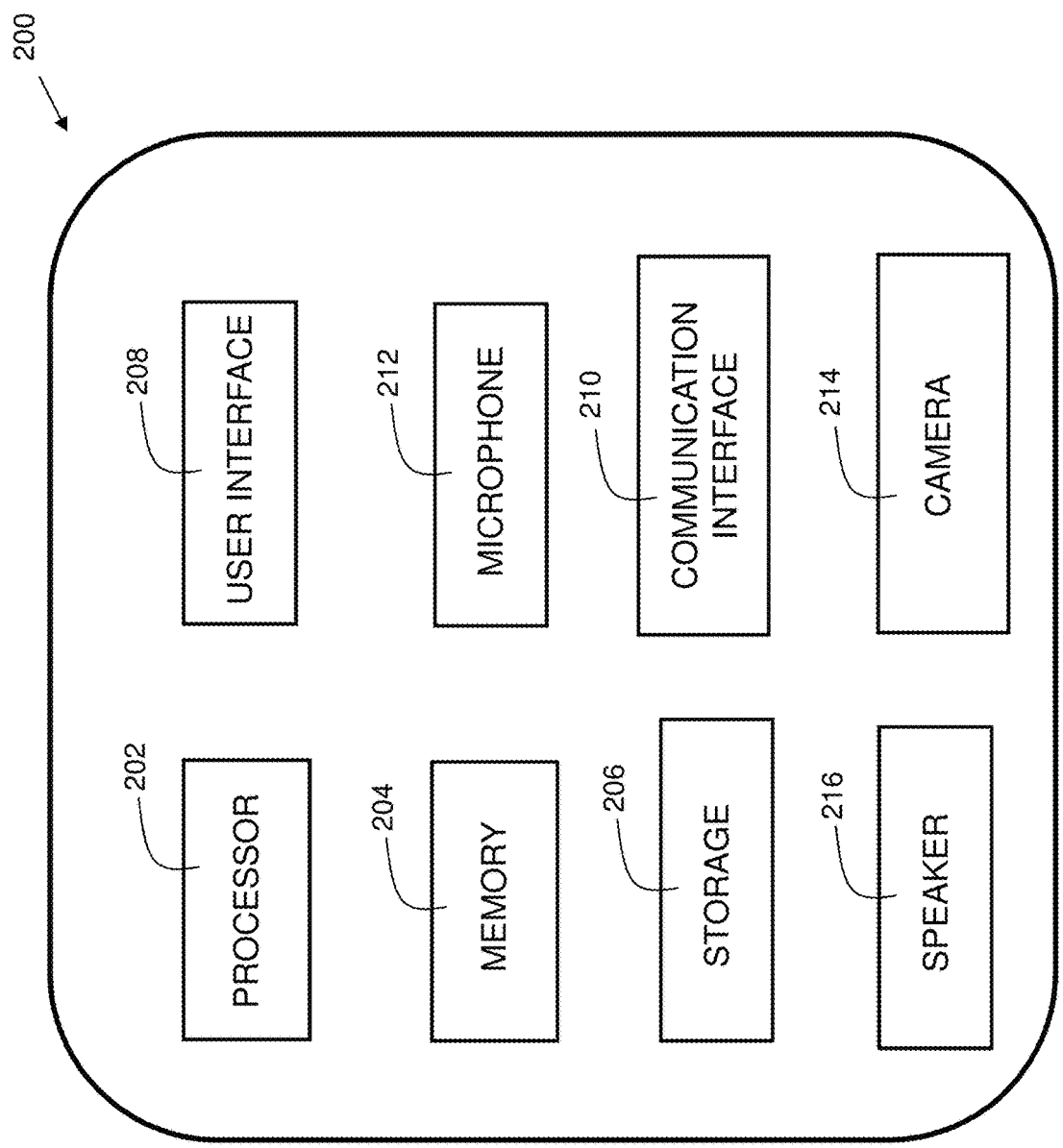
FIG. 2 is a block diagram of a device in accordance with embodiments of the present invention.

FIG. 2 is a block diagram of a device in accordance with embodiments of the present invention. Device 200 is an electronic computing device. Device 200 includes a processor 202, which is coupled to a memory 204. Memory 204 may include dynamic random-access memory (DRAM), static random-access memory (SRAM), magnetic storage, and/or a read only memory such as flash, EEPROM, optical storage, or other suitable memory. In some embodiments, the memory 204 may not be a transitory signal per se. Memory 204 stores instructions 147, which when executed by the processor, implement the steps of the present invention.

Device 200 may further include storage 206. In embodiments, storage 206 may include one or more magnetic storage devices such as hard disk drives (HDDs). Storage 206 may additionally include one or more solid state drives (SSDs).

Device 200 further includes user interface 208. This may be a display, such as an LED display, a touch-sensitive screen, a keyboard, a mouse, or any other suitable interface for a user to interface with device 200.

The device 200 further includes a communication interface 210. The communication interface 210 may be a wired communication interface that includes Ethernet, Gigabit Ethernet, or the like. In embodiments, the communication interface 210 may include a wireless communication interface that includes modulators, demodulators, and antennas for a variety of wireless protocols including, but not limited to, Bluetooth™, Wi-Fi, and/or cellular communication protocols for communication over a computer network.

Device 200 may further include camera 214. The camera may be integral with the device 200 as shown, or connected thereto via a wired or wireless connection.

Device 200 may further include a speaker 216, which may be powered or passive.

Figure 3:
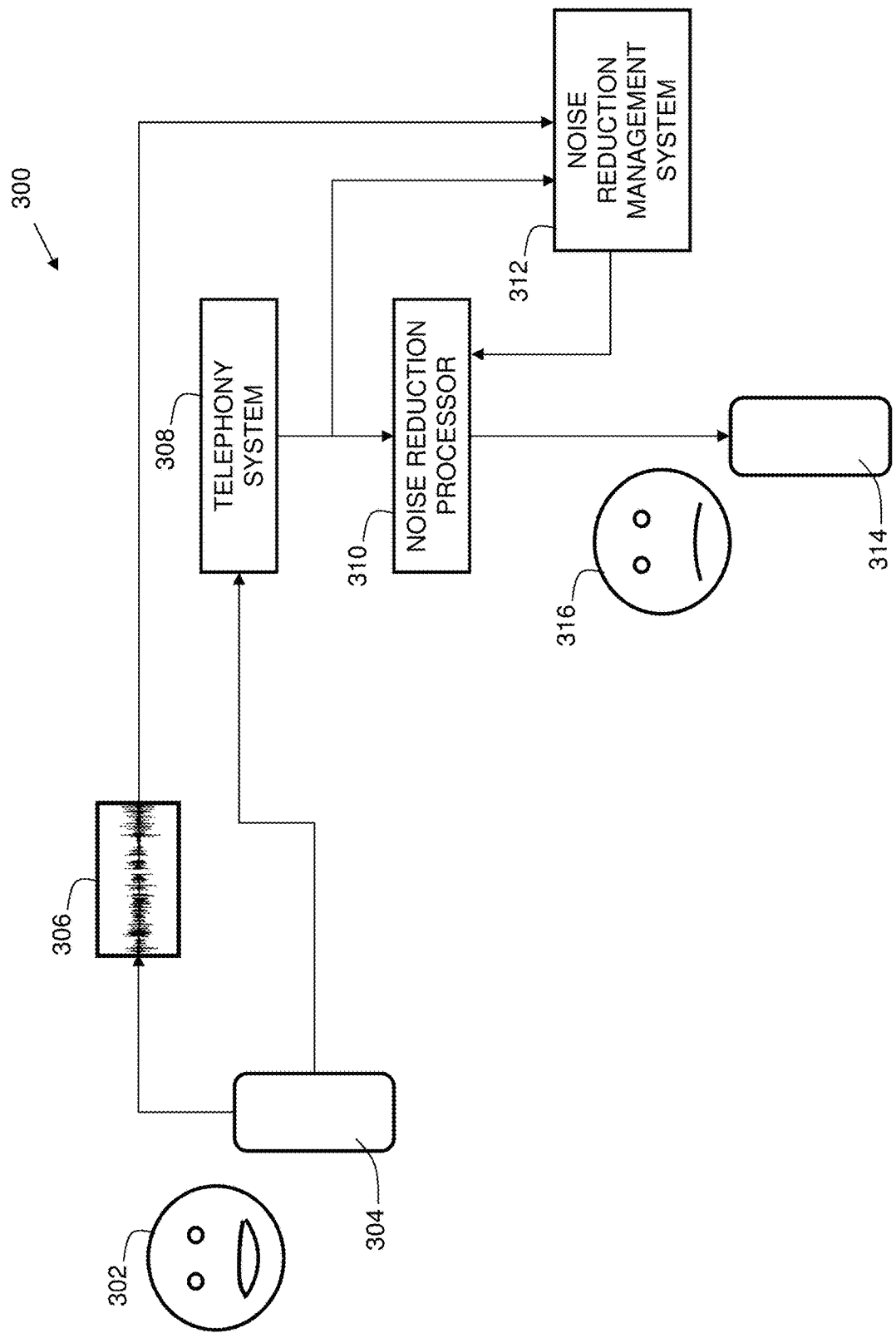
FIG. 3 is a diagram showing flow of audio data in accordance with embodiments of the present invention.

FIG. 3 is a diagram 300 showing a flow of audio data in accordance with embodiments of the present invention. User 302 speaks into electronic communication device 304, which may be a phone, computer, etc. A raw sample 306 is obtained from the speech.

Raw samples may be obtained in any suitable format. For example, in some embodiments, obtaining a raw sample comprises obtaining a sample in a lossless audio format. In some embodiments, obtaining a raw sample comprises obtaining a sample in a PCM audio format. In some embodiments, obtaining a raw sample comprises obtaining a sample in a FLAC (Free Lossless Audio Codec) format.

Once obtained, raw sample 306 is transmitted through the network (such as 124 of FIG. 1) to noise reduction management system 312. Raw sample 306 can be in PCM, FLAC, WAV or another suitable format. Raw sample 306 including audio data is transmitted through the telephony system 308 to noise reduction processor 310. Noise reduction management system 312 compares the quality with different algorithms and sends the data to the noise reduction processor 310. The audio is then transmitted to communication device 314 for recipient 316 to hear. The noise reduction management system 312 can change the active noise reduction algorithm used by noise reduction processor 310 if a significantly better one is found based on current call (active voice session) conditions.

In embodiments, noise reduction management system 312 compares a system-processed sample that temporally corresponds to a raw sample. The raw sample 306 may be transmitted along with timestamps and/or other metadata to enable noise reduction management system to temporally match the same portion of the conversation as received through the telephony system 308. The comparison of the raw sample 306 with the system-processed (received through the telephony system) portion that includes the same speech enables objective quality score computations. As an example, consider that user 302 utters the phrase "Hello Jeremy" into device 304. The raw sample 306 contains the utterance "Hello Jeremy" recorded directly on device 304 and transmitted in a lossless format to the noise reduction management system 312. The noise reduction management system 312 also receives the same utterance ("Hello Jeremy") from the telephony system. This is the system-processed sample. The system-processed sample may have additional filtering and/or signal processing to enable efficient transmission. Thus, the speech quality of the system-processed sample is typically not as good as that of the raw sample. The noise reduction management system then applies multiple noise reduction algorithms to the system-processed sample, to create multiple noise-reduced system-processed samples. Each of these samples is compared to the raw sample, which serves as a reference sample. The comparison (e.g., using perceptual evaluation of speech quality (PESQ) techniques) objectively generates a quality score used to evaluate the efficacy of a given noise reduction algorithm under the current call conditions.

Figure 4:
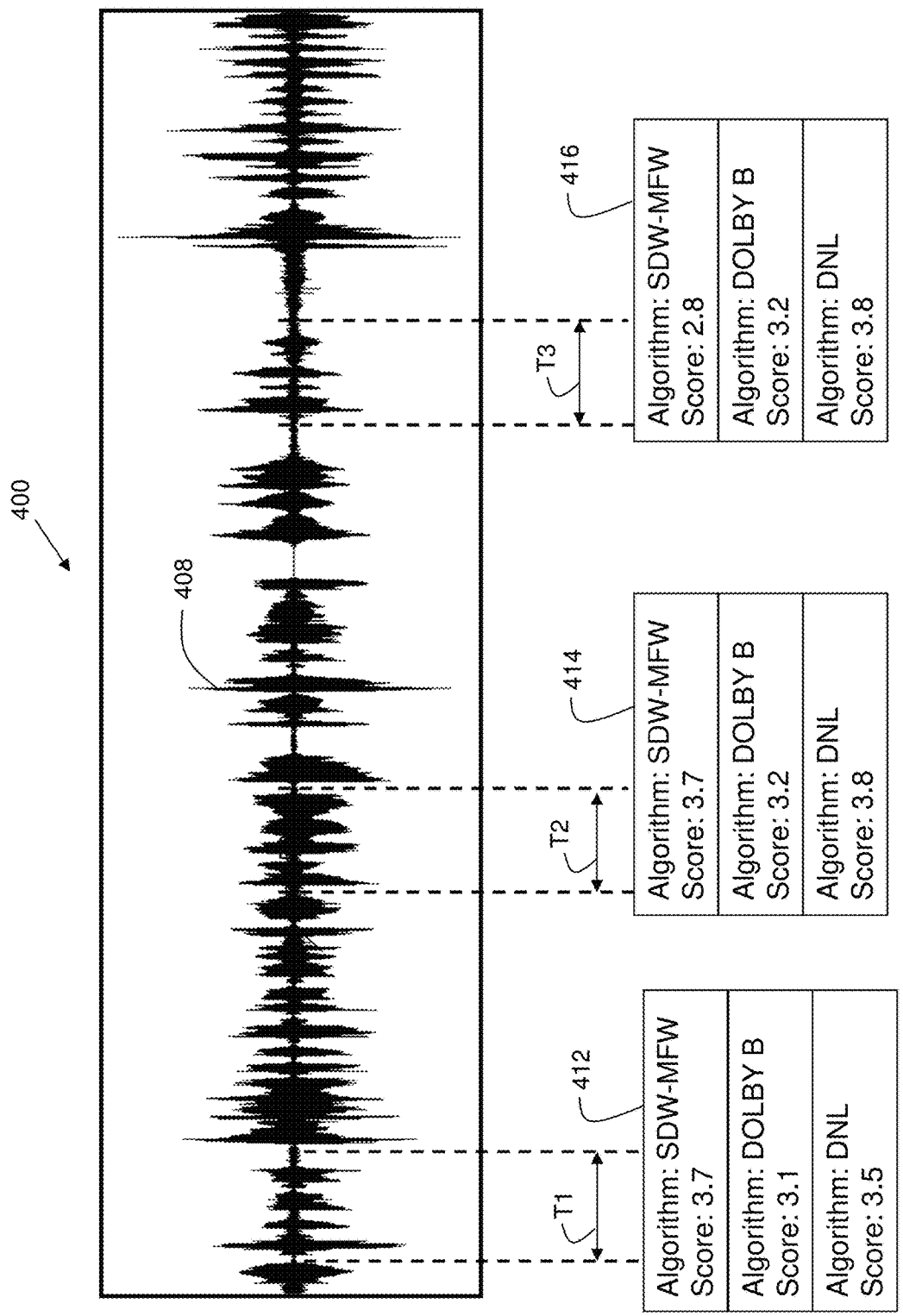
FIG. 4 shows details of an audio waveform analysis in accordance with embodiments of the present invention.

FIG. 4 shows details of an audio waveform analysis 400 in accordance with embodiments of the present invention. Waveform 408 is shown for a period of time. Comparisons 412, 414, and 416 of a plurality of algorithms are shown for three time periods: T1, T2, and T3, respectively, over the course of time.

In some embodiments, at least one noise reduction algorithm of the plurality of noise reduction algorithms includes a speech distortion weighted multi-channel Wiener filter (SDW-MWF) algorithm. The Wiener filter is used to determine an estimate of a target random process via linear time-invariant filtering, assuming known stationary signal and noise spectra, and additive noise. The Wiener filter diminishes the mean square error between the estimated random process and the desired process.

In some embodiments, at least one of the plurality of noise reduction algorithms includes a Dynamic Noise Limiter (DNL) algorithm. A DNL is a single-ended hiss reduction system.

In some embodiments, at least one of the plurality of noise reduction algorithms includes a Dolby B algorithm. Dolby B boosts high-frequency, low-level signals, which can improve speech quality under certain conditions. It should be recognized that the algorithms disclosed herein are examples, and any suitable noise reduction algorithms may be used instead, or in addition.

In the first comparison 412, at time T1, SDW-MFW has the best quality score of 3.7. DNL has the second best with a score of 3.5, and Dolby B is third with a quality score of 3.1. Accordingly, embodiments continue as active the SDW-MFW algorithm, rather than changing to DNL or Dolby B.

In the second comparison 414, at time T2, DNL has the best quality score at 3.8, while SDW-MFW comes in a close second still at 3.7. Accordingly, at time T2, the nature of the call conditions changed from T1 such that DNL produces slightly better speech quality than the SDW-MFW algorithm. Dolby B shows some improvement (compared to time T1) with a quality score of 3.2, but is still lower than the other two algorithms. In some embodiments, the algorithm is changed only if the improvement (quality score delta) is above a predetermined threshold. In this embodiment, the quality score delta of 0.1 between the quality scores of 3.8 and 3.7 does not meet or exceed the predetermined threshold of 0.3. Therefore, the SDW-MFW algorithm is continued as active, rather than changing to DNL.

In the third comparison 416, at time T3, the nature of the call conditions changed since time T2. Dolby B has a quality score of 3.2, the same as at time T2. However, SDW-MFW has a quality score of 2.8 whereas DNL has a quality score of 3.8. That is a difference (quality score delta) of 1.0 between SDW-MFW and DNL. In the example, the quality score delta, 1.0, exceeds the predetermined threshold of 0.3 for a change of algorithm, and accordingly, DNL is changed to active while deactivating SDW-MFW.

Figure 5A:
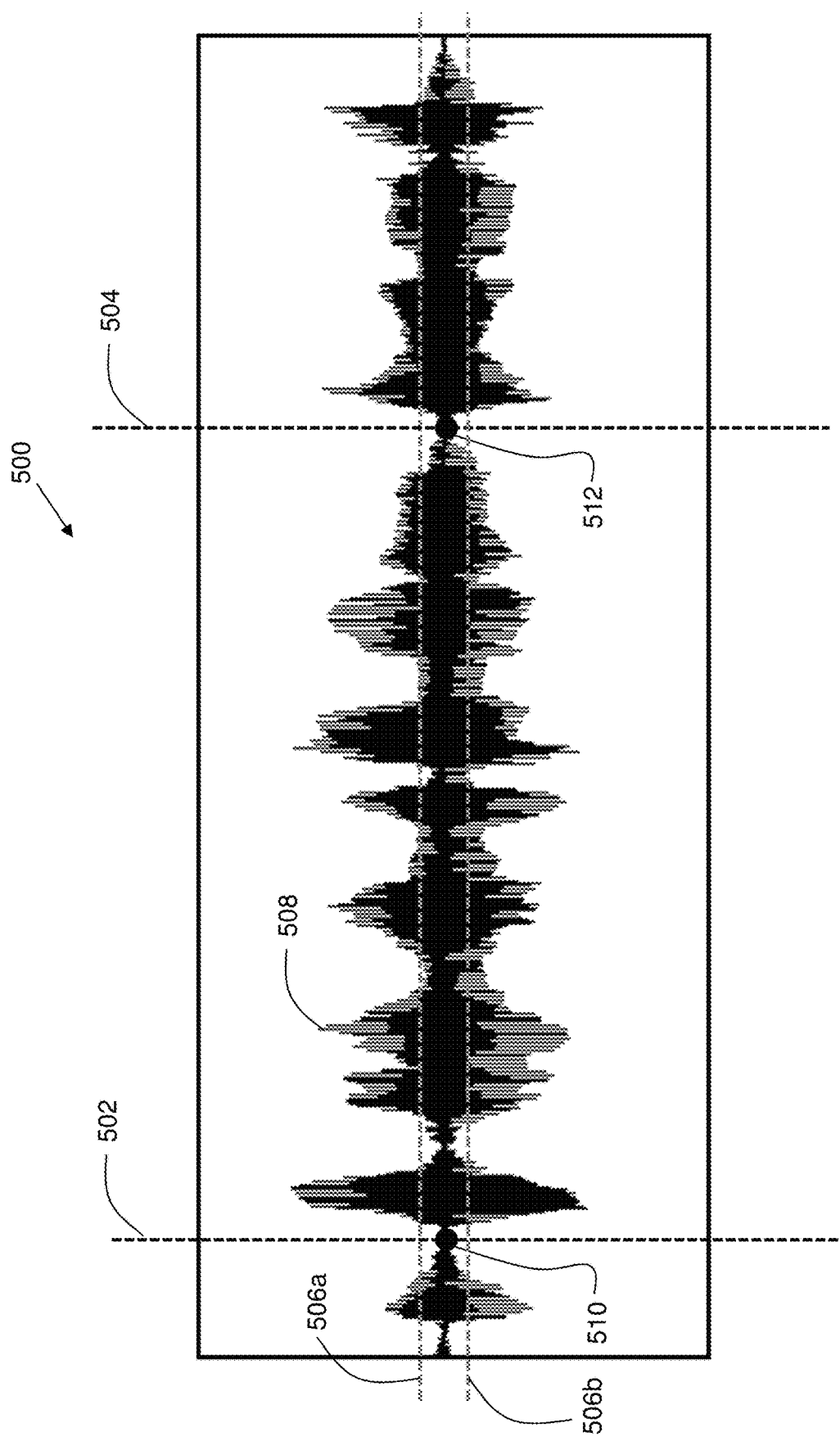
FIG. 5A and FIG. 5B show details of audio waveform analysis.

FIG. 5A shows details 500 of audio waveform analysis. Waveform 508, corresponding to an example raw sample, is shown. Dashed line 502 represents the sample start location, and point 504 represents the sample end location. The waveform has active regions and inactive regions. The inactive regions are silent, or very quiet, compared to the active regions. In embodiments, obtaining a raw sample comprises obtaining a sample comprising a first inactive audio region at a start of the raw sample, and a second inactive audio region at an end of the raw sample. Point 510 is a first inactive audio region, and point 512 is a second inactive audio region. For best results, a sample for analysis should begin and end at an inactive region.

Lines 506a and 506b represent the limits inside of which is considered noise. Line 506a represents the upper noise threshold, and line 506b represents the lower noise threshold. Regions of the audio wave form with a peak amplitude below the upper noise threshold and above the lower threshold is not considered speech, and instead considered noise.

In some embodiments, the first inactive audio region and the second inactive audio region range from 200 milliseconds to 600 milliseconds. This is an example duration, and any suitable duration is included within the scope of the invention.

Figure 5B:
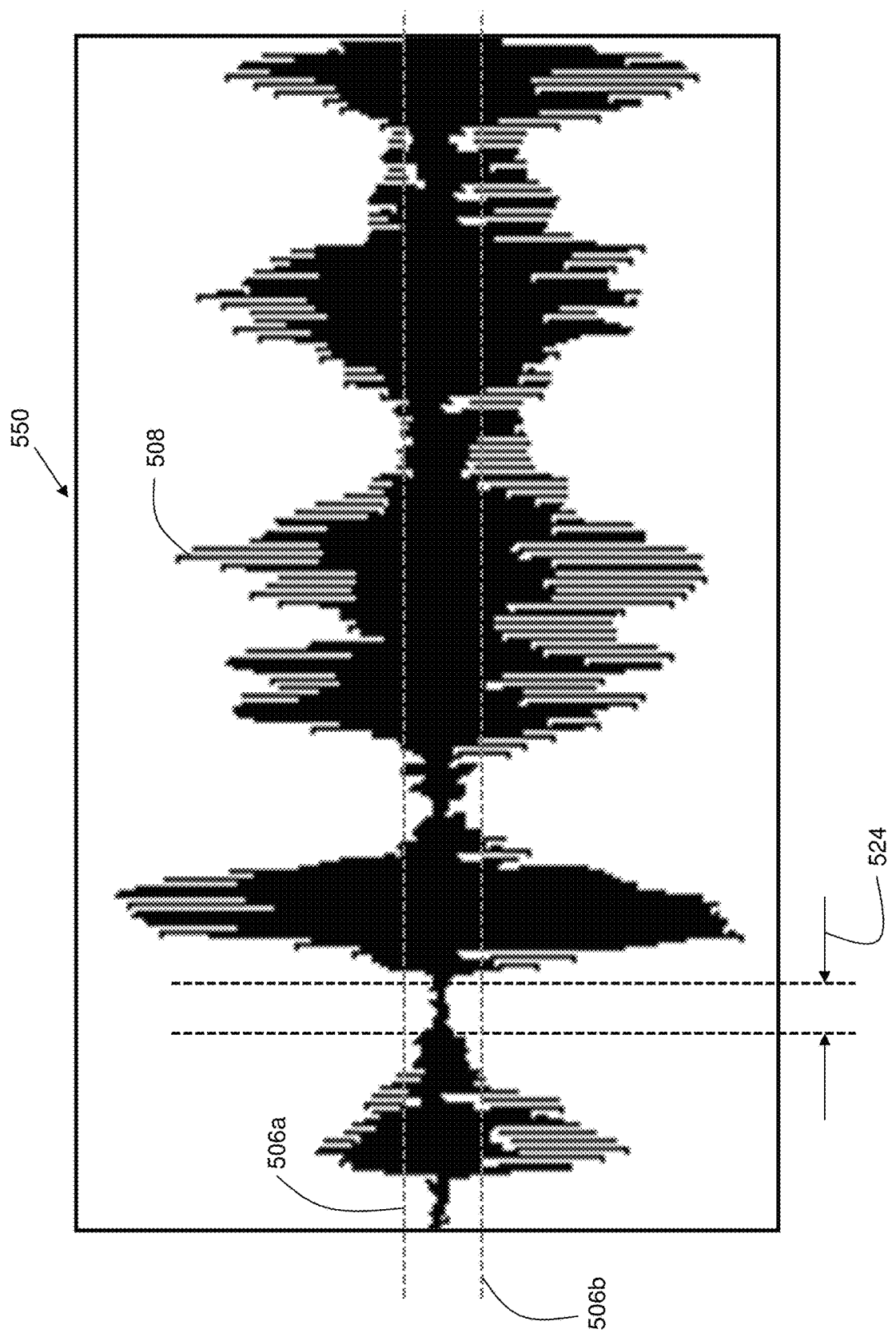

FIG. 5B shows a close-up view of a portion 550 of the audio waveform analysis of FIG. 5A. Section 524 shows a close-up view of the audio sample at 502 of FIG. 5A. As shown, it is an inactive portion of audio, as the peak amplitude of the audio waveform in section 524 is within the limits of threshold lines 506a and 506b.

Figure 6:
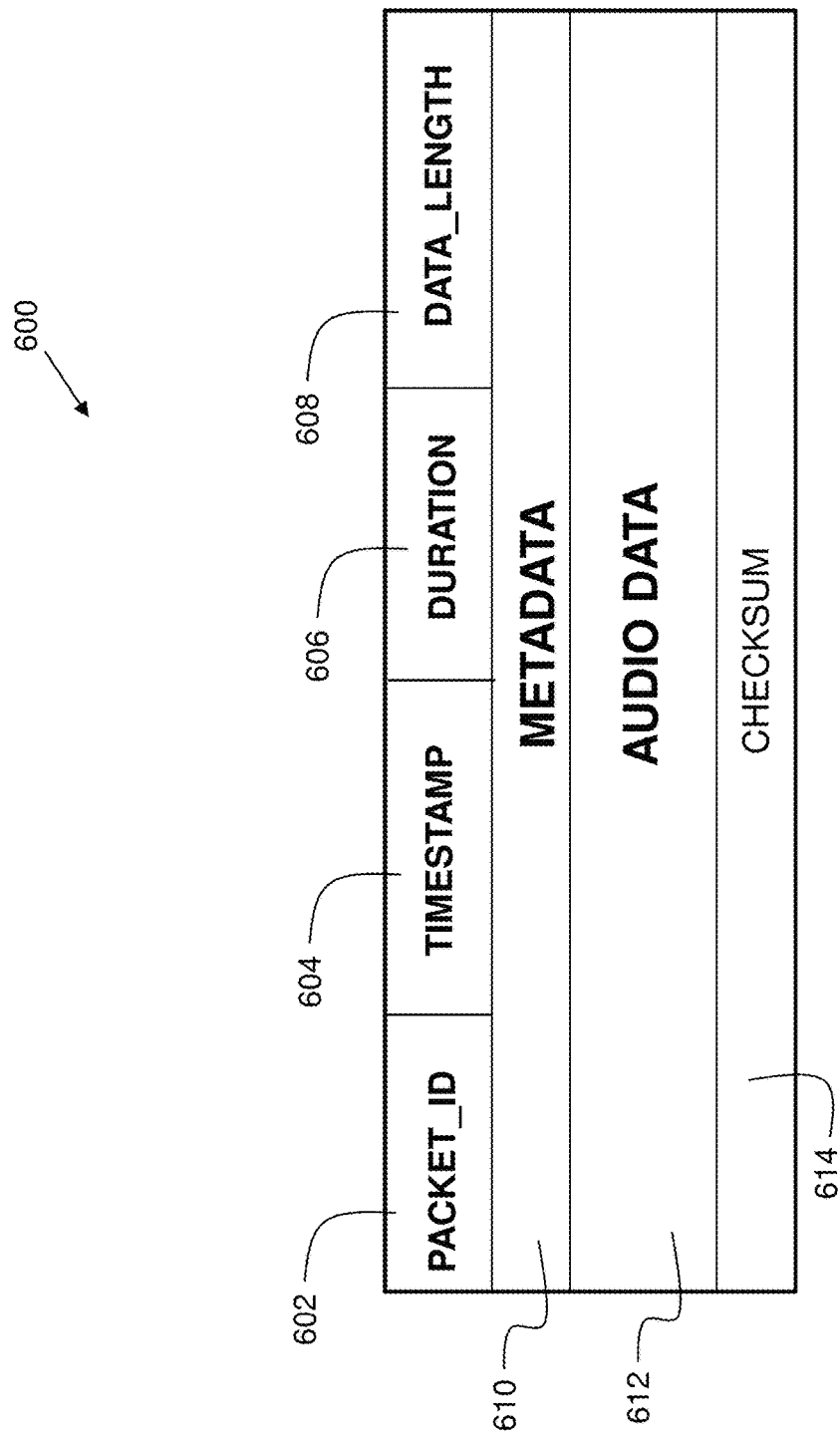
FIG. 6 shows details of a raw sample packet in accordance with embodiments of the present invention.

FIG. 6 shows details 600 of a raw sample packet in accordance with embodiments of the present invention. A header includes packet_ID 602, time 604 the file was made, duration 606 of the sample, and data length 608. Metadata 610 includes data about the audio data 612.

In some embodiments, the plurality of audio parameters includes signal-to-noise ratio (SNR). SNR is a comparison of the level of a target signal to a level of background noise. SNR is the ratio of signal power to the noise power.

In embodiments, the plurality of audio parameters includes total harmonic distortion (THD). The THD is a measurement of the harmonic distortion in a signal. It is the ratio of the sum of the powers of all harmonic components to the power of the fundamental frequency.

In embodiments, the plurality of audio parameters includes dynamic range. It is the ratio between the largest and smallest values that a certain quantity can assume. It is measured as a ratio, or as a base-10 (decibel) or base-2 (doublings, bits, or stops) logarithmic value of the difference between the smallest and largest signal values.

Further examples include phone type, operating system, codecs used, codec versions, etc. Any suitable parameters are included within the scope of the invention. The raw sample packet may further include a checksum 614 for ensuring data integrity. In some embodiments, if the checksum fails, the audio packet is discarded so that the erroneous packet does not cause an improper noise reduction algorithm change.

Figure 7:
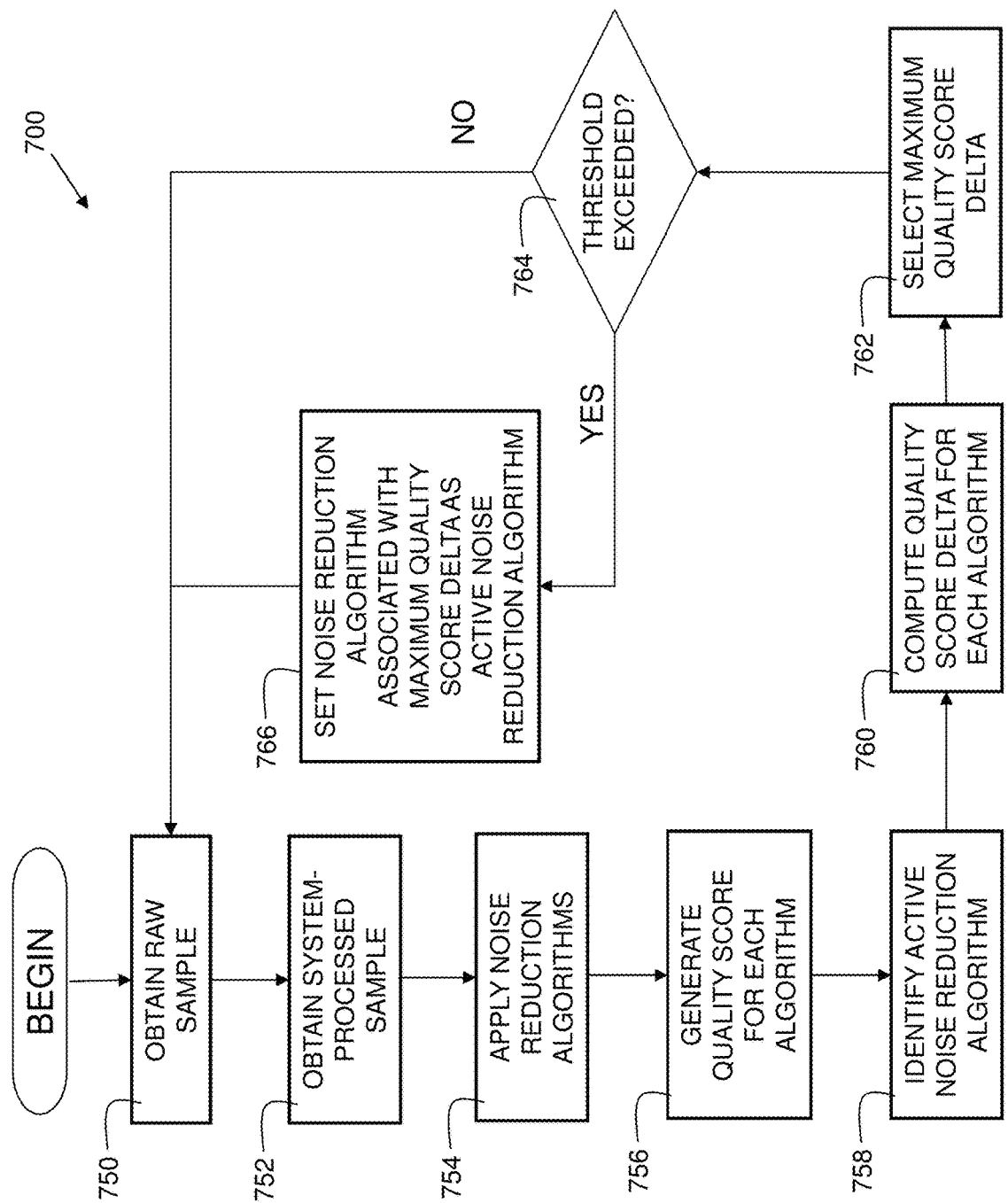
FIG. 7 is a flowchart indicating process steps for embodiments of the present invention.

FIG. 7 is a flowchart 700 indicating process steps for embodiments of the present invention. At 750, a raw sample is obtained. At 752, a system-processed sample is obtained. This processed sample is processed through the telephony system. At 754, noise reduction algorithms are applied. At 756, a quality score is generated for each algorithm.

In some embodiments, the quality score comprises a perceptual evaluation of speech quality (PESQ) score. A PESQ score is an objective method for end-to-end speech quality assessment of narrow-band telephone networks and speech codecs.

According to ITU-T P.863 (09/2014) published by International Telecommunications Union, PESQ compares an original signal X(t) with a degraded signal Y(t) that is the result of passing X(t) through a communications system. The output of PESQ is a prediction of the perceived quality that would be given to Y(t) by subjects in a subjective listening test.

In a PESQ determination in accordance with ITU-T P.863, initially, a series of delays between original input and degraded output are calculated—one for each time interval for which the delay is considerably different from the preceding time interval. A corresponding start and stop point is computed for each of such intervals. The alignment algorithm is based on a comparison of the confidence of having two delays in a particular time interval with the confidence of having a single delay for that interval. The algorithm can account for delay changes both during silences and during active speech parts.

Based on the set of delays that are located, according to ITU-T P.863, PESQ makes a comparison of the original (input) signal (raw sample) with the aligned degraded output of the device under test (system-processed sample) using a perceptual model. Both the original and degraded signals are transformed to an internal representation that is analogous to the psychophysical representation of audio signals in the human auditory system, including perceptual frequency (Bark) and loudness (Sone). This is accomplished in a few stages: time alignment, level alignment to a calibrated listening level, time-frequency mapping, frequency warping, and compressive loudness scaling.

ITU-T P.863 further provides that the internal representation is processed to reflect effects like local gain variations and linear filtering that may—if they are not too severe—have minor perceptual significance. This is accomplished by limiting the amount of compensation and making the compensation lag behind the effect. Therefore, minor, steady-state differences between original and degraded are compensated. More severe effects, or rapid variations, are only partially compensated so that a residual effect remains and contributes to the overall perceptual disturbance. This allows a small number of quality indicators to be used to model all subjective effects. In PESQ, two error parameters are calculated in the cognitive model, and are combined to give an objective listening quality MOS.

In some embodiments, the quality score comprises a subjective and/or objective mean opinion score (MOS) score. In the ITU-T P.10 (11/2017), published by International Telecommunications Union, at 6.140, mean opinion score (MOS) is defined as "The mean of opinion scores". ITU-T P.10 at 6.184 further defines opinion score as "The value on a predefined scale that a subject assigns to his opinion of the performance of the telephone transmission system used either for conversation or for listening to spoken material." In addition to audio bandwidth, factors such as level, application, or listening device and environment have an effect on the absolute MOS value and should be reported according to ITU-T P.800.2 (08/1996) published by International Telecommunications Union.

At 758, an active noise reduction algorithm is identified. At 760, a quality score delta is computed for each algorithm. At 762, a maximum quality score delta is selected. At 764, it is determined whether a delta threshold has been exceeded. If so, at 766, a noise reduction algorithm associated with the maximum quality score delta is set as the active noise reduction algorithm. Embodiments may include identifying a non-speech portion of the active voice session; and performing the changing of the active noise reduction algorithm to a new noise reduction algorithm associated with the maximum quality score delta, during the identified non-speech portion of the active voice session.

The process then continues back to 750 to restart. If at 764, instead, the threshold is not exceeded, then the process continues back to 750 to restart.

As can now be appreciated, disclosed embodiments provide improvements to the technical field of telephony. In standard (POTS) telephony systems, VoIP systems, two-way radio systems, or other voice communication architectures, noise reduction is an important part of acceptable speech quality. Disclosed embodiments can improve the user experience in these and other voice communication systems by adapting to changing noise conditions and applying a new noise reduction algorithm on-the-fly in real time when it is determined that a new noise reduction algorithm can offer significantly better performance.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, location determination and alert message and/or coupon rendering may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, may be non-transitory, and thus is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Program data may also be received via the network adapter or network interface.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While the disclosure outlines exemplary embodiments, it will be appreciated that variations and modifications will occur to those skilled in the art. For example, although the illustrative embodiments are described herein as a series of acts or events, it will be appreciated that the present invention is not limited by the illustrated ordering of such acts or events unless specifically stated. Some acts may occur in different orders and/or concurrently with other acts or events apart from those illustrated and/or described herein, in accordance with the invention. In addition, not all illustrated steps may be required to implement a methodology in accordance with embodiments of the present invention. Furthermore, the methods according to embodiments of the present invention may be implemented in association with the formation and/or processing of structures illustrated and described herein as well as in association with other structures not illustrated. Moreover, in particular regard to the various functions performed by the above described components (assemblies, devices, circuits, etc.), the terms used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of embodiments of the invention may have been disclosed with respect to only one of several embodiments, such feature may be combined with one or more features of the other embodiments as may be desired and advantageous for any given or particular application. Therefore, it is to be understood that the appended claims are intended to cover all such modifications and changes that fall within the true spirit of embodiments of the invention.

What is claimed is:

1. A computer-implemented method for noise reduction in a telephony system, comprising:
    obtaining a raw sample of an active voice session, the raw sample being one of a plurality of raw samples collected periodically during the active voice session, the active voice session being a telephony session;
    obtaining a system-processed sample of the active voice session, wherein the system-processed sample temporally corresponds to the raw sample;
    processing the system-processed sample with a plurality of noise reduction algorithms, to generate a noise-reduced sample corresponding to each algorithm of the plurality of noise reduction algorithms;
    comparing the raw sample and each noise-reduced sample, and computing a quality score for each noise-reduced sample;

identifying an active noise reduction algorithm that is in the process of actively providing noise reduction for the active voice session;

identifying an active quality score corresponding to the active noise reduction algorithm;

for each algorithm of the plurality of noise reduction algorithms, subtracting the active quality score from the quality score for each noise-reduced sample to compute a quality score delta corresponding to each noise-reduced algorithm with respect to the active noise reduction algorithm; and changing the active noise reduction algorithm from the active noise reduction algorithm that is in the process of actively providing noise reduction for the active voice session to a new noise reduction algorithm associated with a maximum quality score delta, in response to the maximum quality score delta exceeding a predetermined threshold.

2. The method of claim 1, wherein obtaining a raw sample comprises obtaining a sample comprising a first inactive audio region at a start of the raw sample, and a second inactive audio region at an end of the raw sample.

3. The method of claim 2, wherein the first inactive audio region and the second inactive audio region range from 200 milliseconds to 600 milliseconds.

4. The method of claim 1, wherein the quality score comprises a PESQ score.

5. The method of claim 1, wherein the quality score comprises a mean opinion score (MOS).

6. The method of claim 1, further comprising:
computing a plurality of audio parameters for the raw sample; and
inputting the plurality of audio parameters and the noise-reduction algorithm corresponding to the maximum quality score into a machine learning system as training data.

7. The method of claim 6, wherein the plurality of audio parameters includes signal-to-noise ratio.

8. The method of claim 7, wherein the plurality of audio parameters includes total harmonic distortion.

9. The method of claim 8, wherein the plurality of audio parameters includes dynamic range.

10. The method of claim 9, further comprising:
obtaining a second raw sample, the second raw sample being a different raw sample of the plurality of raw samples collected at a different temporal period from the raw sample;
computing a plurality of audio parameters for the second raw sample;
inputting the plurality of audio parameters to the machine learning system;
obtaining a recommended noise-reduction algorithm, and
changing the active noise reduction algorithm to the recommended noise-reduction algorithm.

11. The method of claim 1, wherein obtaining a raw sample comprises obtaining a sample in a FLAC format.

12. The method of claim 1, wherein at least one of the plurality of noise reduction algorithms includes a speech distortion weighted multi-channel Wiener filter (SDW-MWF) algorithm.

13. The method of claim 1, wherein at least one of/ the plurality of noise reduction algorithms includes a Dynamic Noise Limiter algorithm.

14. The method of claim 1, further comprising:
identifying a non-speech portion of the active voice session; and
performing the changing of the active noise reduction algorithm to a new noise reduction algorithm associated with the maximum quality score delta, during the identified non-speech portion of the active voice session.

* * * * *